United States Patent
Venkataraman et al.

(10) Patent No.: US 7,769,593 B2
(45) Date of Patent: Aug. 3, 2010

(54) METHOD AND APPARATUS FOR ACTIVE NOISE CANCELLATION

(75) Inventors: Anand Venkataraman, Palo Alto, CA (US); Venkata Ramana Rao Gadde, Santa Clara, CA (US); Martin Graciarena, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 903 days.

(21) Appl. No.: 11/541,282

(22) Filed: Sep. 28, 2006

(65) Prior Publication Data

US 2008/0082326 A1    Apr. 3, 2008

(51) Int. Cl.
*G10L 15/00* (2006.01)
(52) U.S. Cl. .................. 704/275; 704/270; 381/110
(58) Field of Classification Search .............. 704/275, 704/270; 381/110
See application file for complete search history.

(56) References Cited

U.S. PATENT DOCUMENTS

| | | | |
|---|---|---|---|
| 5,267,323 A * | 11/1993 | Kimura | 381/110 |
| 6,496,107 B1 * | 12/2002 | Himmelstein | 340/426.1 |
| 6,606,280 B1 * | 8/2003 | Knittel | 367/198 |
| 6,718,307 B1 * | 4/2004 | Buil et al. | 704/270 |
| 7,006,974 B2 * | 2/2006 | Burchard et al. | 704/275 |
| 7,260,538 B2 * | 8/2007 | Calderone et al. | 704/275 |
| 7,321,857 B2 * | 1/2008 | Rodriguez et al. | 704/275 |
| 2004/0128137 A1 * | 7/2004 | Bush et al. | 704/275 |
| 2005/0027539 A1 | 2/2005 | Weber et al. | |
| 2005/0159945 A1 | 7/2005 | Otsuka et al. | |
| 2006/0041926 A1 | 2/2006 | Istvan et al. | |

FOREIGN PATENT DOCUMENTS

JP    2001-100785    4/2001

* cited by examiner

*Primary Examiner*—Daniel D Abebe

(57) ABSTRACT

In one embodiment, the present invention is a method and apparatus for active noise cancellation. In one embodiment, a method for recognizing user speech in an audio signal received by a media system (where the audio signal includes user speech and ambient audio output produced by the media system and/or other devices) includes canceling portions of the audio signal associated with the ambient audio output and applying speech recognition processing to an uncancelled remainder of the audio signal.

34 Claims, 3 Drawing Sheets

METHOD AND APPARATUS FOR ACTIVE NOISE CANCELLATION

FIELD OF THE INVENTION

The present invention relates generally to speech recognition and relates more particularly to speech recognition in noisy environments.

BACKGROUND OF THE INVENTION

Presently, remote control of media systems, including media center applications such as channel guide or jukebox applications and car audio systems is difficult. In the case of media center applications, the applications are typically controlled by using a mouse or by issuing a voice command. In the case of voice command, however, ambient noise (such as that produced by the media center application itself) often makes it difficult for speech recognition software to successfully recognize the issued commands.

Thus, there is a need in the art for a method and apparatus for active noise cancellation (i.e., cancellation of noise produced by a media system itself).

SUMMARY OF THE INVENTION

In one embodiment, the present invention is a method and apparatus for active noise cancellation. In one embodiment, a method for recognizing user speech in an audio signal received by a media system (where the audio signal includes user speech and ambient audio output produced by the media system and/or other devices) includes canceling portions of the audio signal associated with the ambient audio output and applying speech recognition processing to an uncancelled remainder of the audio signal.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to active noise cancellation for speech recognition applications, such as speech recognition applications used to control media systems (e.g., systems that at least produce audio output, and may produce other outputs such as video) including media center applications running on personal computers (PCs), televisions and car audio and navigation systems. Embodiments of the invention exploit the fact that a media system has knowledge of the audio signals being delivered via its output channels. This knowledge may be applied to cancel out ambient noise produced by the media system in audio signals received (e.g., via a microphone) by a speech recognition application running on the media system. The accuracy of subsequent speech recognition processing of the received audio signals (e.g., to extract spoken user commands) is thus significantly enhanced.

Figure 1:
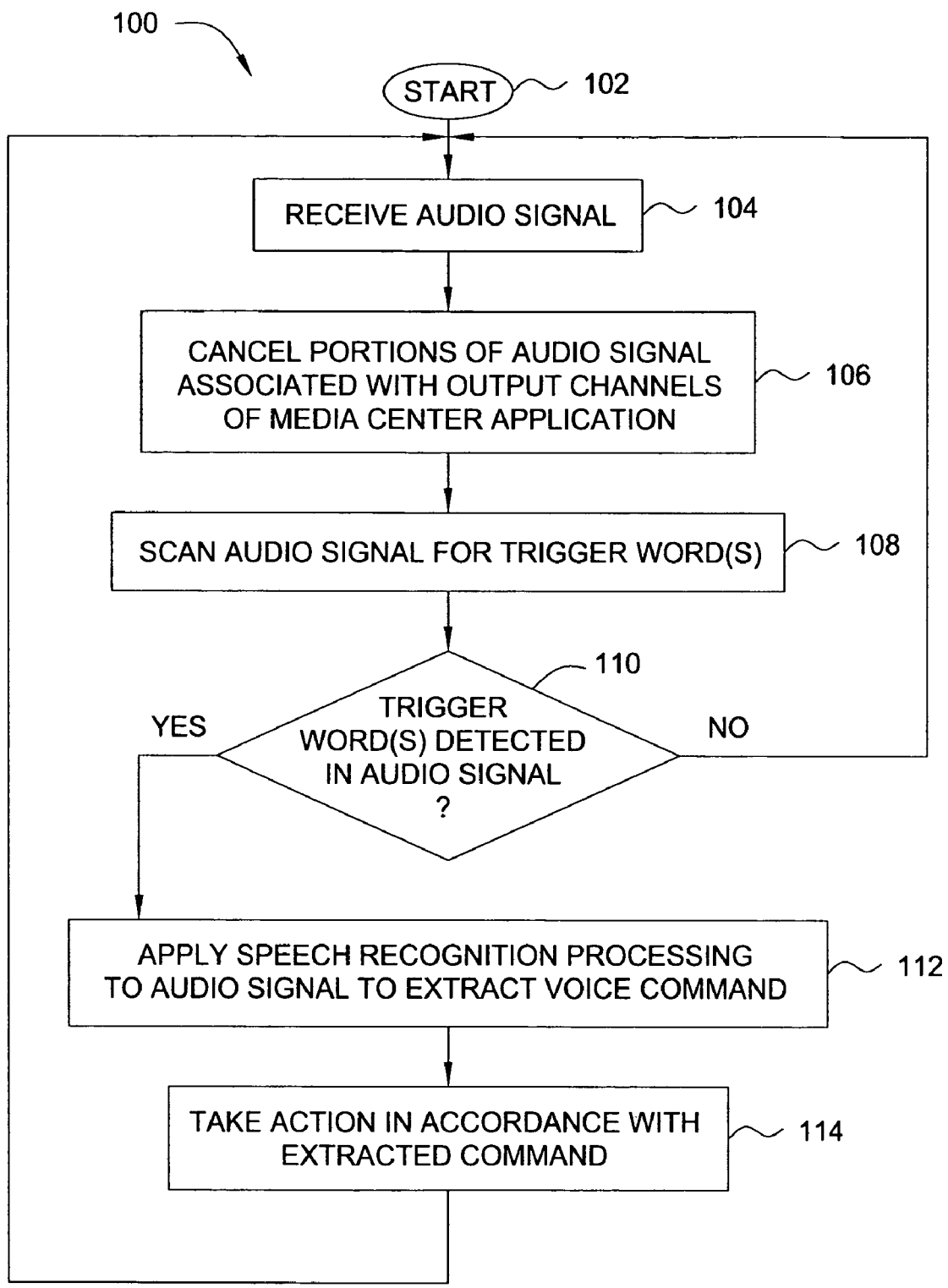
FIG. 1 is a flow diagram illustrating one embodiment of a method for active noise cancellation, according to the present invention.

FIG. 1 is a flow diagram illustrating one embodiment of a method 100 for active noise cancellation, according to the present invention. The method 100 may be implemented, for example, on a personal computer that runs a media center application or in a car audio system. The method 100 is initialized at step 102 and proceeds to step 104, where the method 100 receives an audio signal that originates external to the media system. In one embodiment, the received audio signal comprises at least audio output produced by the media system. In a further embodiment, the received audio signal also comprises user speech (e.g., a spoken user command) and/or other ambient noise. In one embodiment, the audio signal is received via a microphone that is interfaced to the system. In one embodiment, the microphone is incorporated in at least one of: a remote control, an amplifier or a media center device (e.g., PC, television, stereo, etc.) or component thereof.

In step 106, the method 100 cancels portions of the received audio signal that are associated with output channels of the media system. Thus, for example, if the media system is a jukebox media center application that emits six-channel audio from a PC (e.g., amplified and fed through six speakers placed at various locations within a room including the PC), the six channels of emitted audio are precisely the signals that need to be removed from the system's microphone input. In one embodiment, the portions of the received audio signal that are associated with output channels of the media system are cancelled by subtracting those portions of the audio signal from the received audio signal. In one embodiment, this is done by applying offsets for each output channel, where the offsets are calculated in accordance with a previously applied calibration technique described in greater detail with reference to FIG. 2.

In step 108, the method 100 scans the received audio signal for a trigger word. The trigger word is a word that indicates that a user of the media center application is issuing a voice command, and may be followed by the voice command. For example, the user may utter the phrase "<TRIGGER_WORD> Switch to KQED", where "switch to KQED" is the command that the user wants the media center application to execute. The utterance of a trigger word triggers speech recognition in the media center application.

In step 110, the method 100 determines whether a trigger word has been detected in the received audio signal. If the method 100 concludes in step 110 that a trigger word has not been detected, the method 100 returns to step 104 and proceeds as described above to continue to process the audio signal and scan for trigger words.

Alternatively, if the method 100 concludes in step 110 that a trigger word has been detected, the method 100 proceeds to step 112 and applies speech recognition processing to the incoming audio signal in order to extract the voice command (e.g., following the trigger word). In one embodiment, the speech recognition application processes the audio signal in accordance with a small and tight speech recognition grammar.

In step 114, the method 100 takes some action in accordance with the extracted command (e.g., changes a radio station to KQED in the case of the example above). The method 100 then returns to step 104 and proceeds as described above to continue to process the audio signal and scan for trigger words.

By applying knowledge of the audio signals produced by the media system to cancel ambient noise in the received audio signal, more accurate recognition of spoken user commands can be achieved. That is, the signals associated with the media system's output channels can be removed from the received audio signal (e.g., as picked up by a microphone) in a fairly precise manner. Thus, even a user command that is spoken softly and/or from a distance away can be detected and recognized, despite the ambient noise produced by the media system.

Figure 2:
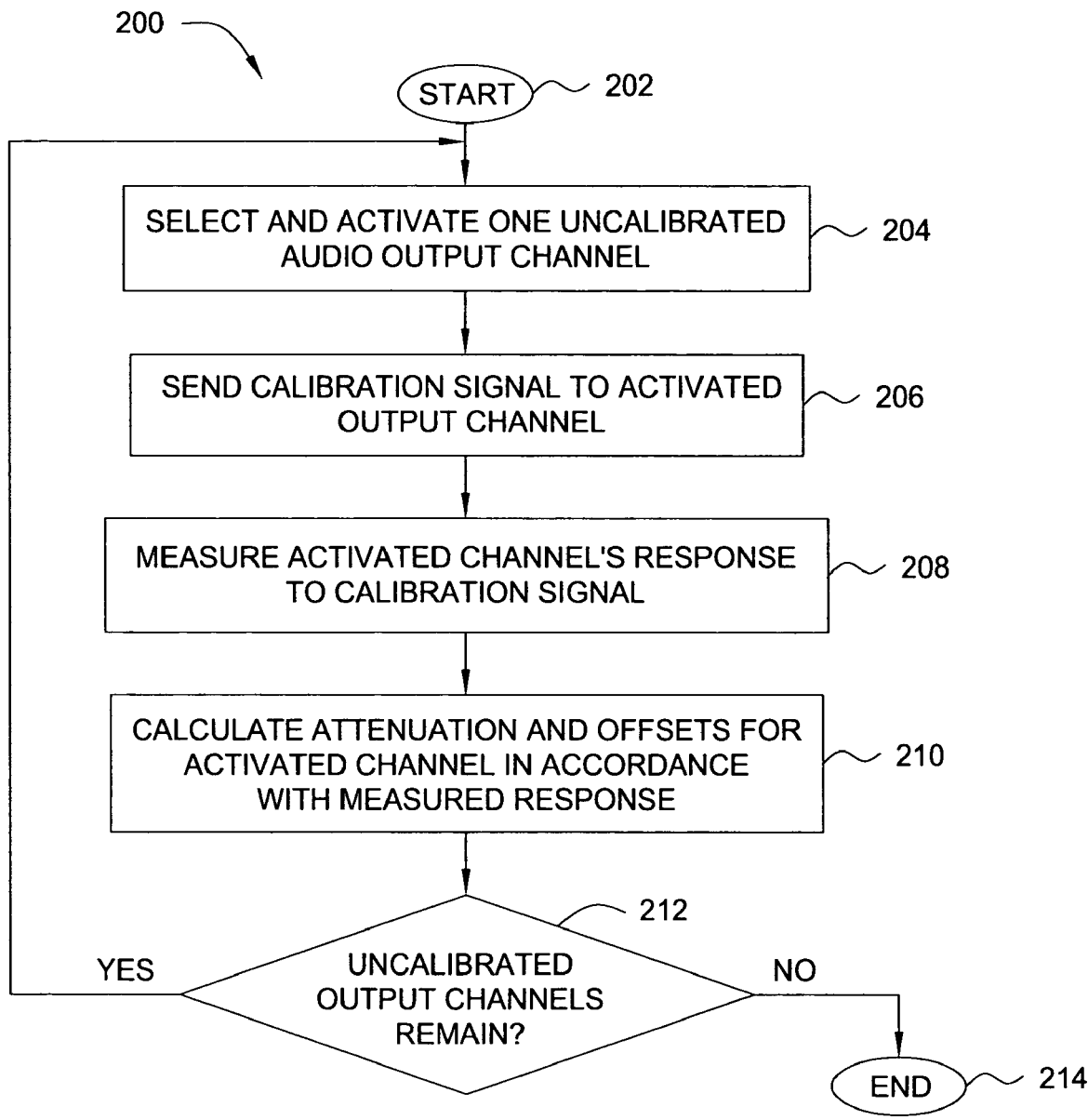
FIG. 2 is a flow diagram illustrating one embodiment of a method for calibrating an audio output system for active noise cancellation, according to the present invention.

FIG. 2 is a flow diagram illustrating one embodiment of a method 200 for calibrating an audio output system for active noise cancellation, according to the present invention. That is, the method 200 determines the proper attenuations and offsets to be applied to a received audio signal in order to cancel ambient noise produced, for example, by a media system. The method 200 may thus be applied prior to execution of the method 100, so that ambient noise produced by the media system can be cancelled in the received audio signal.

The method 200 is initialized at step 202 and proceeds to step 204, where the method 200 selects and activates one audio output channel. The selected channel is a channel that has not yet been calibrated.

In step 206, the method 200 sends a calibration signal to the activated output channel. The method 200 then proceeds to step 208 and measures the channel's response to the calibration signal, e.g., as determined by reception at a microphone interfaced to the media system. In one embodiment, the response includes the time elapsed between the sending of the calibration signal and the reception of the channel's response, as well as the distortion in the channel's response (i.e., caused by the channel's audio output being emitted via the channel and then picked up again by the microphone).

In step 210, the method 200, calculates, in accordance with the response measured in step 208, the attenuation (e.g., to compensate for distortions) and offsets for the activated channel. The calculated offsets are the offsets that will later be applied to cancel the output from the activated channel in an audio signal received by the media system (e.g., as described with respect to step 106 of FIG. 1).

In step 212, the method 200 determines whether there are any output channels that remain to be calibrated. If the method 200 concludes in step 212 that at least one output channel still requires calibration, the method 200 returns to step 204 and proceeds as described above in order to calibrate the remaining channel(s). Alternatively, if the method 200 concludes in step 212 that there are no uncalibrated output channels remaining, the method 200 terminates in step 214.

Figure 3:
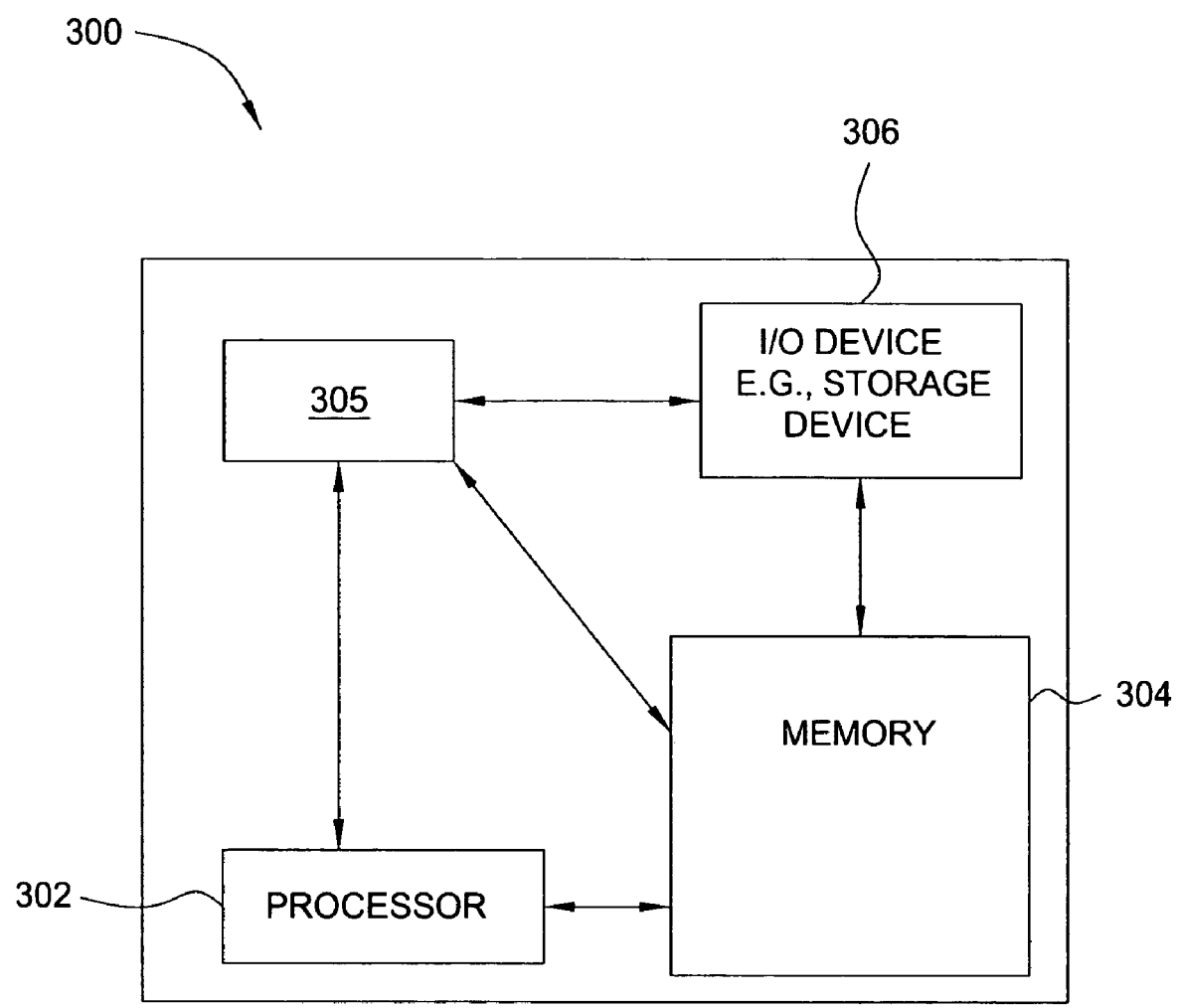
FIG. 3 is a high level block diagram of the noise cancellation method that is implemented using a general purpose computing device.

FIG. 3 is a high level block diagram of the noise cancellation method that is implemented using a general purpose computing device 300. In one embodiment, a general purpose computing device 300 comprises a processor 302, a memory 304, a noise cancellation module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the noise cancellation module 305 can be implemented as a physical device or subsystem that is coupled to a processor through a communication channel.

Alternatively, the noise cancellation module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the noise cancellation module 305 for canceling ambient noise in speech recognition applications described herein with reference to the preceding Figures can be stored on a computer readable medium or carrier (e.g., RAM, magnetic or optical drive or diskette, and the like).

Those skilled in the art will appreciate that the concepts of the present invention may be advantageously deployed in a variety of applications, and not just those running on media center PCs. For instance, any audio application in which speech-driven control is desirable and the audio output is knowable may benefit from application of the present invention, including car audio systems and the like. The present invention may also aid users of telephones, including cellular phones, particularly when using a telephone in a noisy environment such as in an automobile (in such a case, the cellular phone's communicative coupling to the audio source may comprise, for example, a wireless personal or local area network such as a Bluetooth connection, a WiFi connection or a built-in wire).

In addition, the present invention may be advantageously deployed to control a variety of other (non-media center) PC applications, such as dictation programs, Voice over IP (VoIP) applications, and other applications that are compatible with voice control.

Thus, the present invention represents a significant advancement in the field of speech recognition applications. Embodiments of the invention exploit the fact that a media system has knowledge of the audio signals being delivered via its output channels. This knowledge may be applied to cancel out ambient noise produced by the media system in audio signals received (e.g., via a microphone) by a speech recognition application running on the PC. The accuracy of subsequent speech recognition processing of the received audio signals (e.g., to extract spoken user commands) is thus significantly enhanced.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for recognizing user speech in an audio signal received by a media system, said audio signal comprising user speech and ambient audio output, the method comprising:
    canceling portions of said audio signal associated with said ambient audio output, where said ambient audio output is associated with an audio output delivered via at least one output channel of said media system;
    applying speech recognition processing to an uncancelled remainder of said audio signal; and
    calibrating said media system prior to said canceling and said applying, wherein said calibrating comprises, for each of said at least one output channel:
        activating said at least one output channel;
        sending a calibration signal to said at least one output channel;
        measuring a response of said at least one output channel to said calibration signal; and
        calculating at least one offset compensating for said audio output produced by the at least one output channel of said media system, in accordance with said response.

2. The method of claim 1, wherein said response comprises a time elapsed between said sending and a reception of said response.

3. The method of claim 2, wherein said response further comprises a distortion in said response.

4. The method of claim 1, wherein said canceling comprises:
applying at least one offset to said audio signal, said at least one offset compensating for said audio output produced by the at least one output channel of said media system.

5. The method of claim 4, wherein said applying comprises:
calculating said at least one offset in accordance with a response of said at least one output channel to a calibration signal.

6. The method of claim 1, wherein said applying comprises:
detecting a trigger word in said audio signal; and
commencing speech recognition processing of at least a portion of said audio signal following said trigger word.

7. The method of claim 6, wherein said detecting comprises:
scanning said audio signal for one or more trigger words including said trigger word on a continuous basis.

8. The method of claim 6, wherein said at least a portion of said audio signal following said trigger word comprises a command uttered by a source of said user speech.

9. The method of claim 8, further comprising:
taking an action in accordance with said command.

10. The method of claim 1, wherein said audio signal is received via a microphone interfaced to said media system.

11. The method of claim 1, wherein said canceling comprises:
determining a level of distortion in said audio signal that is attributable to said ambient audio output being received in said audio signal; and
compensating for said level of distortion prior to applying said speech recognition processing.

12. The method of claim 1, wherein said media system comprises at least one of: a personal computer media system, a television, a car audio system, or a car navigation system.

13. A non-transitory computer readable medium containing an executable program for recognizing user speech in an audio signal received by a media system, said audio signal comprising user speech and ambient audio output, where the program performs steps of:
canceling portions of said audio signal associated with said ambient audio output, where said ambient audio output is associated with an audio output delivered via at least one output channel of said media system;
applying speech recognition processing to an uncancelled remainder of said audio signal; and
calibrating said media system prior to said canceling and said applying, wherein said calibrating comprises, for each of said at least one output channel:
activating said at least one output channel;
sending a calibration signal to said at least one output channel;
measuring a response of said at least one output channel to said calibration signal; and
calculating at least one offset compensating for said audio output produced by the at least one output channel of said media system, in accordance with said response.

14. The computer readable medium of claim 13, wherein said canceling comprises:
applying at least one offset to said audio signal, said at least one offset compensating for said audio output produced by the at least one output channel of said media system.

15. The computer readable medium of claim 14, wherein said applying comprises:
calculating said at least one offset in accordance with a response of said at least one output channel to a calibration signal.

16. The computer readable medium of claim 13, wherein said applying comprises:
detecting a trigger word in said audio signal; and
commencing speech recognition processing of at least a portion of said audio signal following said trigger word.

17. The computer readable medium of claim 16, wherein said detecting comprises:
scanning said audio signal for one or more trigger words including said trigger word on a continuous basis.

18. The computer readable medium of claim 16, wherein said at least a portion of said audio signal following said trigger word comprises a command uttered by a source of said user speech.

19. The computer readable medium of claim 18, further comprising:
taking an action in accordance with said command.

20. The computer readable medium of claim 13, wherein said audio signal is received via a microphone interfaced to said media system.

21. The computer readable medium of claim 13, wherein said canceling comprises:
determining a level of distortion in said audio signal that is attributable to said ambient audio output being received in said audio signal; and
compensating for said level of distortion prior to applying said speech recognition processing.

22. The computer readable medium of claim 13, wherein said media system comprises at least one of: a personal computer media system, a television, a car audio system, or a car navigation system.

23. The computer readable medium of claim 13, wherein said response comprises a time elapsed between said sending and a reception of said response.

24. The computer readable medium of claim 23, wherein said response further comprises a distortion in said response.

25. An apparatus for recognizing user speech in an audio signal received by a media system, said audio signal comprising user speech and ambient audio output, comprising:
means for canceling portions of said audio signal associated with said ambient audio output, where said ambient audio output is associated with an audio output delivered via at least one output channel of said media system;
means for applying speech recognition processing to an uncancelled remainder of said audio signal; and
means for calibrating said media system, wherein said means for calibrating comprises, for each of said at least one output channel:
means for activating said at least one output channel;
means for sending a calibration signal to said at least one output channel;
means for measuring a response of said at least one output channel to said calibration signal; and
means for calculating at least one offset compensating for said audio output produced by the at least one output channel of said media system, in accordance with said response.

26. The apparatus of claim 25, wherein said means for canceling comprises:
means for applying at least one offset to said audio signal, said at least one offset compensating for said audio output produced by the at least one output channel of said media system.

27. The apparatus of claim 26, wherein said means for applying comprises:
  means for calculating said at least one offset in accordance with a response of said at least one output channel to a calibration signal.

28. The apparatus of claim 25, wherein said means for applying comprises:
  means for detecting a trigger word in said audio signal; and
  means for commencing speech recognition processing of at least a portion of said audio signal following said trigger word.

29. The apparatus of claim 28, wherein said means for detecting scans said audio signal for one or more trigger words including said trigger word on a continuous basis.

30. The apparatus of claim 28, wherein said at least a portion of said audio signal following said trigger word comprises a command uttered by a source of said user speech.

31. The apparatus of claim 30, further comprising:
  means for taking an action in accordance with said command.

32. The apparatus of claim 25, further comprising a microphone interfaced to said media system for receiving said audio signal.

33. The apparatus of claim 25, wherein said means for canceling comprises:
  means for determining a level of distortion in said audio signal that is attributable to said ambient audio output being received in said audio signal; and
  means for compensating for said level of distortion prior to applying said speech recognition processing.

34. The apparatus of claim 25, wherein said media system comprises at least one of: a personal computer media system, a television, a car audio system, or a car navigation system.

* * * * *